(12) United States Patent
Maggio et al.

(10) Patent No.: US 6,227,750 B1
(45) Date of Patent: May 8, 2001

(54) UNIVERSAL ADJUSTABLE ANGLE BRACKET FOR CONCRETE LEVELING AND FINISHING TOOLS

(75) Inventors: Leonard C. Maggio, Hacienda Heights; Richard A. Maggio, Laguna Hills, both of CA (US)

(73) Assignee: Superior Featherweight Tools Company, Inc., City of Industry, CA (US)

( * ) Notice: Subject to any disclaimer, the term of this patent is extended or adjusted under 35 U.S.C. 154(b) by 0 days.

(21) Appl. No.: 09/181,509

(22) Filed: Oct. 28, 1998

(51) Int. Cl.[7] ............................. F16C 11/00; F16D 1/12; F16D 3/00
(52) U.S. Cl. ............................. 403/79; 403/77; 15/235.8
(58) Field of Search ............................. 403/79, 76, 77, 403/114, 122, 131; 15/235.8, 235.4; 411/295, 299, 298, 348, 351

(56) References Cited

U.S. PATENT DOCUMENTS

| 1,713,513 | * | 5/1929 | Abram | 15/235.8 |
|---|---|---|---|---|
| 2,834,199 | * | 5/1958 | Freeman | 15/235.8 |
| 2,934,937 | * | 5/1960 | Bennett | 15/235.8 |
| 3,090,066 | * | 5/1963 | Ferrell, Jr. et al. | 15/235.8 |
| 3,146,481 | * | 9/1964 | Chiuchiarelli | 15/235.8 |
| 3,162,881 | * | 12/1964 | Negwer | 15/235.8 |
| 3,798,701 | * | 3/1974 | Irwin et al. | 15/235.8 |
| 4,335,485 | * | 6/1982 | Paine et al. | 15/235.8 |
| 4,520,527 |   | 6/1985 | Maggio et al. . |  |
| 4,856,932 | * | 8/1989 | Kraft | 404/118 |
| 4,892,437 | * | 1/1990 | Kraft | 404/97 |
| 5,487,259 | * | 1/1996 | Powers et al. | 56/298 |
| 6,052,857 | * | 4/2000 | Donahue | 15/235.4 |

* cited by examiner

Primary Examiner—Lynne H. Browne
Assistant Examiner—John B. Walsh
(74) Attorney, Agent, or Firm—Harold L. Jackson

(57) ABSTRACT

An adjustable tilting bracket for concrete finishing tools include a base plate, with an elongated slot in the bottom thereof, the slot being arranged to straddle a reinforcing rib on the tool. A yoke is pivotally mounted on the base plate and includes a cylindrical passageway in which a handle receiving member is located. A guide slot is formed in an upper arcuate portion of the yoke and cooperates with a stop member protruding from the handle receiving member to allow the handle receiving member to traverse an angle of about 180°, say from 3 o'clock to 9 o'clock, within the yoke. An actuating rod is pivotally mounted between the base plate and a caming ring secured to the forward end of the handle receiving member so that the base plate and a leveling/finishing tool secured thereto will pivot about an axis parallel to the tool's receiving slot. An adjustable braking element is carried by the yoke for exerting a frictional force on the handle receiving member for controlling the force required to rotate the handle receiving member to change the angle of the leveling/finishing tool relative to a concrete slab.

8 Claims, 3 Drawing Sheets

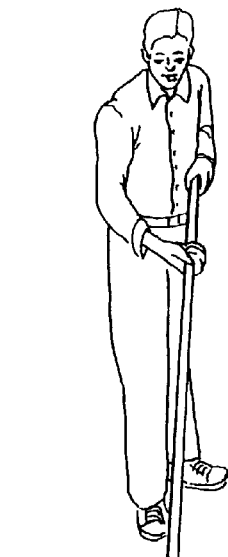
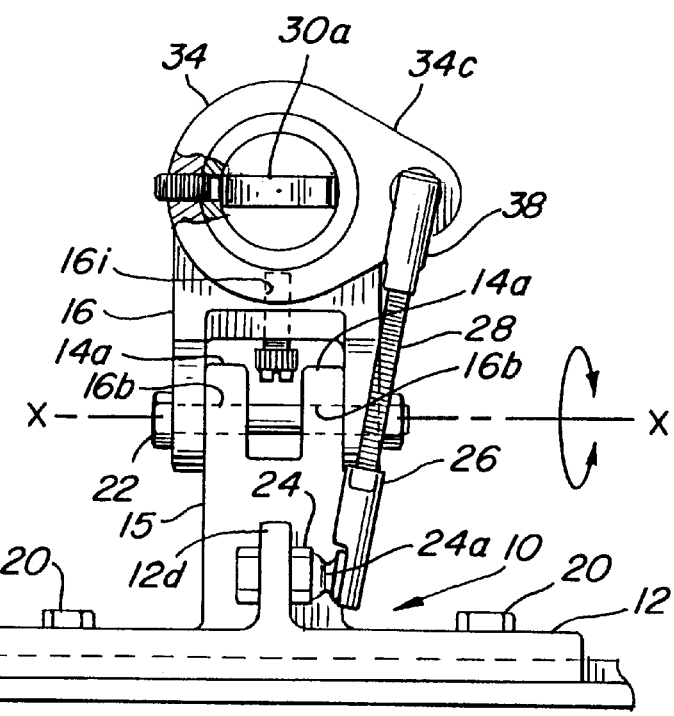
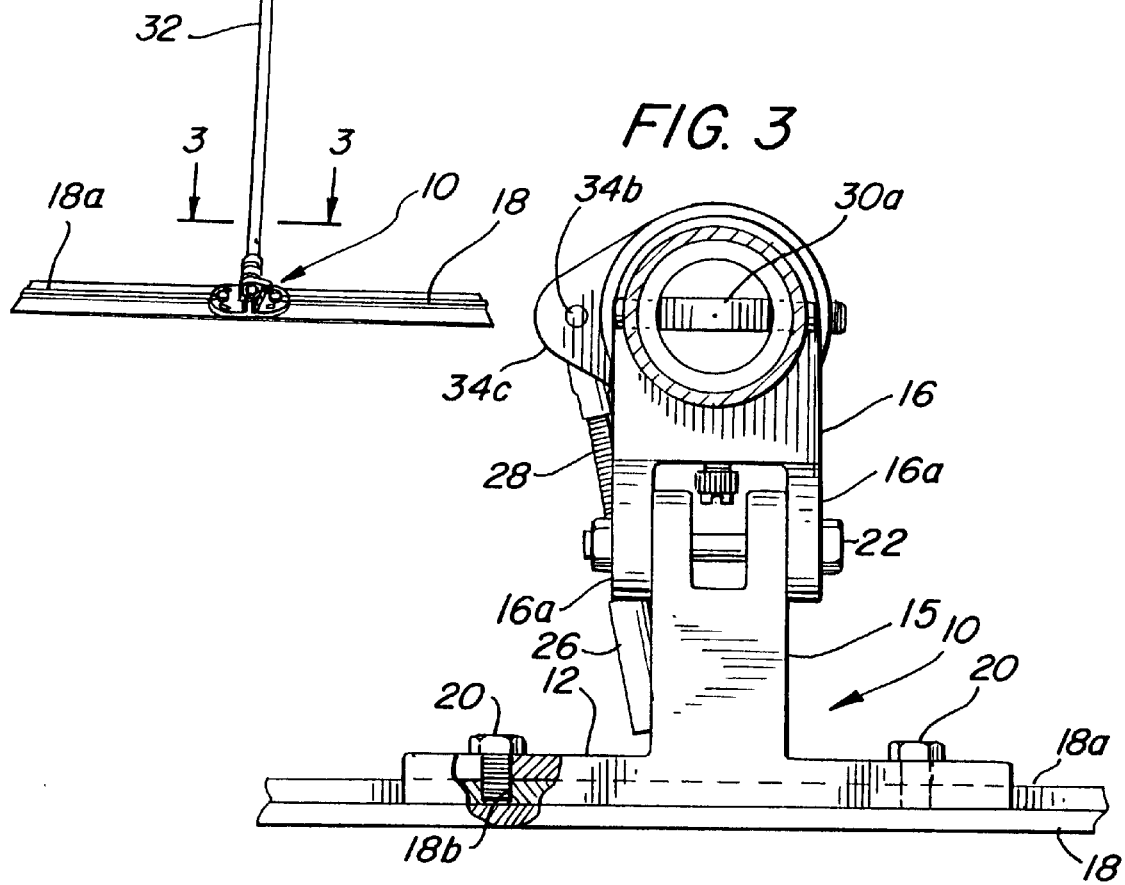

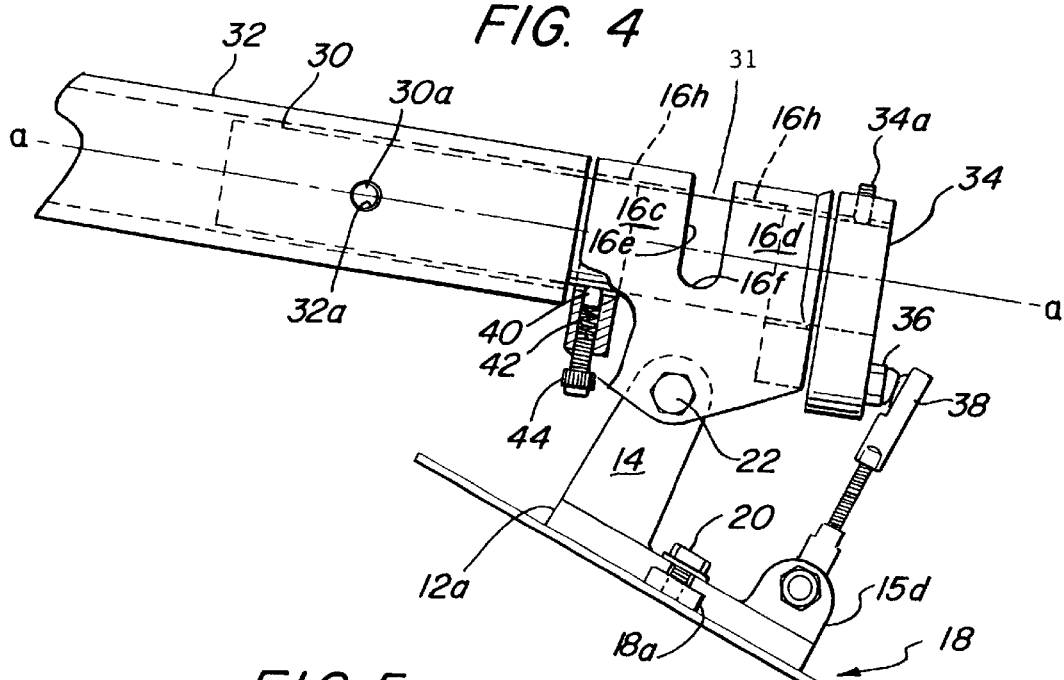
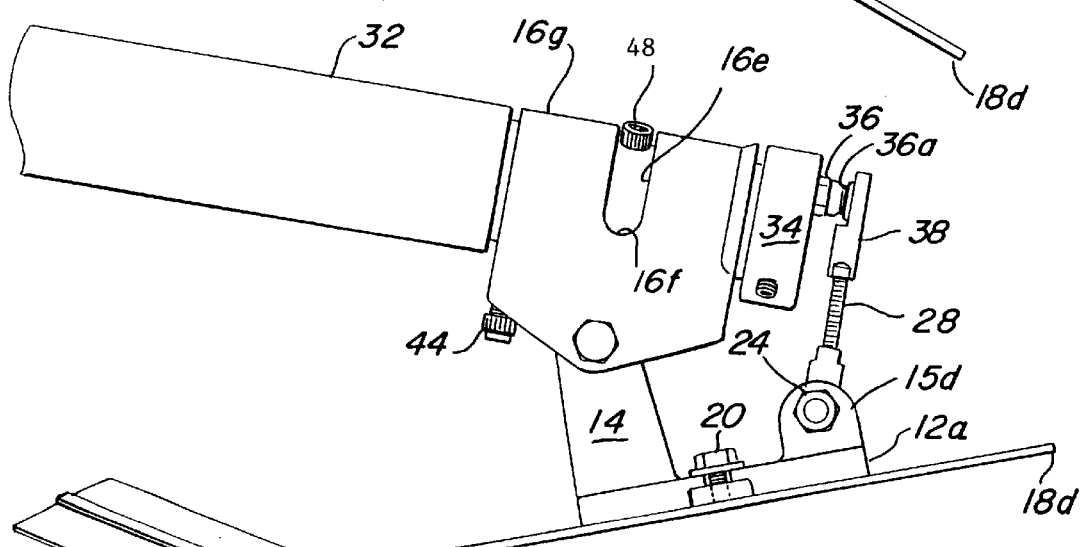
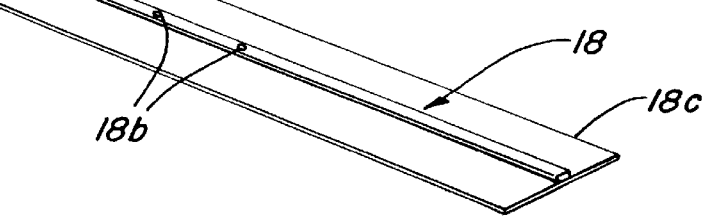

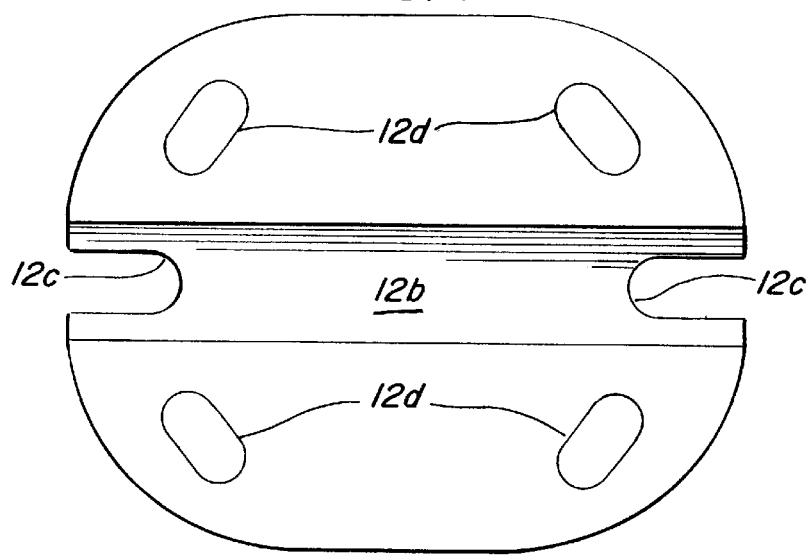
FIG. 7
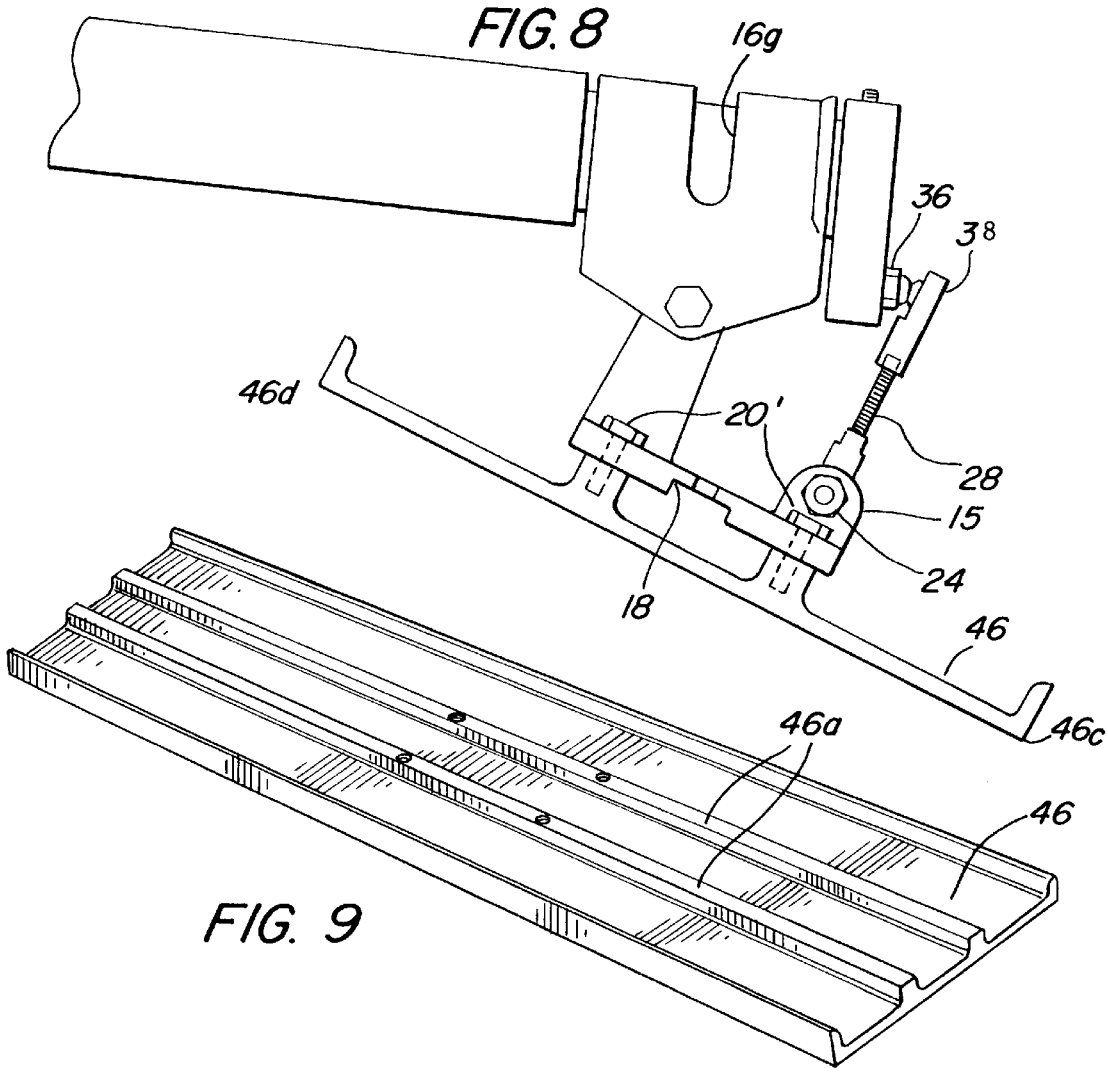
FIG. 8
FIG. 9

ABSTRACT# UNIVERSAL ADJUSTABLE ANGLE BRACKET FOR CONCRETE LEVELING AND FINISHING TOOLS

BACKGROUND OF THE INVENTION

1. Field of the Invention

The present invention relates to an improved adjustable tilt bracket for attachment to a concrete leveling or finishing tool such as a bull float or fresno which allows a user to adjust the angle of the tool's smoothing plate as it is being pulled towards or pushed away from the user.

2. Description of the Prior Art

It has been well known in the art that many problems and difficulties are encountered in providing a simple and easy means for establishing a level and smooth finish to large slabs of concrete. It is desired that the fine particles of sand and concrete be brought to the surface and that the larger particles, e.g., rocks and/or gravel, distribute themselves through the lower regions of the concrete. This segregation of particles is facilitated by the use of a leveling tool such as a trowel (for small slabs) or a bull float (for large slabs), which the user drags back and forth over the surface of the slab. Once the slab is leveled with the desired particle distribution and the cement is partially set up it is generally necessary to provide a smooth finish. This is accomplished with a trowel (for small slabs) and a fresno (for large slabs).

Bull floats generally comprise a flat smoothing plate of considerable width, e.g., 48" or more and a shorter depth, e.g., 12" with one or more (generally two) rectangular reinforcing ribs running the width of the smoothing plate. Fresnos, which are smaller than bull floats, e.g., 36" to 48" in width and 4" to 8" in depth, are formed of a relatively thin spring steel smoothing plate or blade with a centrally located relatively narrow rectangular reinforcing rib running the width of the plate. Bull floats, as well as fresnos, are adapted to receive handle flanges via bolts threaded into tapped bores in the reinforcing ribs. Long handles can be pivotally attached to the handle flanges.

Long handles attached to handle flanges enable a user, such as a cement mason, to trowel large surface areas. However, a problem arises when using a bull float (or fresno) with a long handle attached thereto. The leading edge of the smoothing plate needs to be slanted upwardly (in the direction of motion) so that the trailing edge will spread the concrete (in the direction of motion) and smooth its surface. Since the float is drawn towards the user and then pushed away, it is necessary to change the angle of incidence by either lowering the long handle when pushing the bull float (or fresno) and raising it when pulling the float. This works adequately when a medium length handle (e.g., less than about ten to twelve feet) is used. If, however, a long handle (e.g., 15 or more feet) is employed the height required to lift the free end of the handle to provide an appropriate angle for the float when pulling it will, in many instances, be out of reach of the user or in the range where he or she can no longer exert adequate force to pull the float. Furthermore, when pushing the float away from the user, to correct the tilt of the edge of the bull float, the handle may have to be lower than the surface of the concrete being prepared.

The problem of changing the angle of a bull float's smoothing plate without requiring any vertical movement of the handle is addressed by U.S. Pat. No. 4,520,527 ("'527 patent") issued to inventors Richard Maggio et al. The '527 patent describes a bull float bracket which changes the angle of the smoothing plate (i.e., bottom surface of the float) in response to a rotation of the handle, independently of the handle height. A yoke is pivotally mounted on a T-shaped strut formed integrally with the smoothing plate. A locking ring, located on each side of the yoke, is secured to a short tubular handle receiving member, adapted to receive the long handle, to accommodate longitudinal forces thereby locking the tubular member and handle to the bull float.

A connecting rod is pivotally mounted at one end to a circumferential point on the forward locking ring and at the other end to the base of the strut. A prior art modification of the '527 bracket utilized a slotted yoke with a bolt threaded into the tubular member so that the bolt slides between the ends of the slot (spaced at about 180°) The force required to rotate the handle receiving member (and the handle) was controlled by the adjustment of a screw (generally a set screw) mounted within a threaded bore in the yoke so that the end of the screw would bear against the outer surface of the tubular handle receiving member. The friction between the end of the set screw and the tubular handle receiving member provide a retarding torque to rotation of the handle, to maintain the angle of incidence of the bracket (and the smoothing plate) after the user had rotated the handle to the desired degree during a subsequent push or pull operation. However, very small changes in the rotation of the set screw would at times result in large changes in the frictional force thereby either allowing the handle to rotate too freely or requiring an excessive force to make subsequent angle changes. This problem was exacerbated as the handle length increased.

The '527 patent illustrates how the bracket was connected to a bull float having a single reinforcing rib in the form of a relatively deep plate. Such brackets have also been connected to bull floats with two spaced reinforcing ribs with the bracket base resting on top of the ribs. However, such brackets have not found use with fresnos because the narrow ribs do not afford a sufficient supporting surface.

The present invention overcomes the above as well as other shortcomings of the prior art devices.

SUMMARY OF THE INVENTION

An adjustable tilting bracket for concrete leveling/finishing tools in accordance with the present invention includes a base plate with a plurality of spaced holes through which bolts may be inserted for attaching the base plate to one or more reinforcing ribs of a leveling/finishing tool. The bottom surface of the base plate is provided with an centrally located lateral elongated slot for receiving a finishing tool's reinforcing bar.

A yoke, pivotally mounted to the base plate, defines a cylindrical passageway aligned at a right angle to the mounting slot and the pivot axis.

A guide slot, formed in an upper arcuate portion of the yoke, circumscribes an arc extending from about 3 o'clock to 9 o'clock. A handle receiving member is rotatably mounted in the cylindrical passageway with a caming ring mounted on the distal or forward end of the handle receiving member for rotation therewith. A stop member, secured to the handle receiving member, rides in the arcuate slot in the yoke.

An actuating rod is pivotally mounted between the caming ring pivot point and the base plate so that the base plate and a leveling/finishing tool secured thereto will pivot about the pivot axis in response to rotation of the handle receiving member.

An adjustable braking element is carried by the yoke to exert a frictional force on the handle securing member for maintaining the angle of the base plate fixed once deliberate rotation of the handle receiving member ceases. Preferably, the braking element is in the form of a friction plug, spring and screw positioned with in a threaded bore in the yoke.

The features of the present invention may be best understood by reference to the following description taken in conjunction with the accompanying drawings in which like components are given the same reference numerals in the several figures.

BRIEF DESCRIPTION OF THE DRAWINGS

FIG. 1 is a pictorial view of a user employing the bracket of the present invention as attached to a fresno to finish the surface of a slab of concrete;

FIG. 2 is a front elevational view of the bracket and fresno finishing tool taken along lines 3—3 of FIG. 1;

FIG. 3 is a rear-elevational view (partially in cross section) of the bracket and tool taken along line 3—3 of FIG. 1;

FIG. 4 is a side elevational view of the bracket and tool (partially in cross section) with the smoothing plate tilted at an angle to accommodate a pulling action by the user;

FIG. 5 is a side elevational view of the tool with the smoothing plate tilted to accommodate a pushing action by the user;

FIG. 6 is a perspective view of the fresno of FIG. 1, per se;

FIG. 7 is a bottom plan view of the base plate of the bracket of the present invention showing the lateral slot therein for mounting over a reinforcing rib;

FIG. 8 is a side elevational view of the bracket as mounted on a bull float; and FIG. 9 is a perspective view of the bull float of FIG. 8, per se.

DETAILED DESCRIPTION OF THE DRAWING

Referring now to the drawings and in a particular to FIGS. 1–7, the adjustable angle bracket 10 of the present invention includes a base plate 12, having integrally formed therewith, an upwardly extending post 14 located adjacent a rear edge 12a thereof. The post is pivotally attached to a yoke 16 as will be explained. The base plate 12 has an elongated lateral mounting slot 12b extending upwardly from the bottom surface 20 thereof for receiving (i.e., straddling) a centrally located rectangular reinforcing rib (and handle mounting bar) 18a of a fresno 18 (or a bull float). See FIG. 7. The base plate also has a centrally located U-shaped opening 12c extending inwardly from each side thereof. The openings 12c accommodate bolts 20 which are threaded into tapped blind bores 18b in the centrally located reinforcing rib 18a to secure the fresno to the underside of the base plate. The bottom plate or blade 18d of the fresno 18 is sometimes referred to as a smoothing plate. The base plate of the bracket further includes a plurality of holes 12d on each side of the strut through which bolts may pass for threading into tapped holes in the reinforcing ribs of bull floats as will be explained in more detail in connection with FIGS. 8 and 9.

The yoke 16 of the bracket is formed with two downwardly projecting side members 16a which have aligned holes 16b drilled therein. The side members 16a straddle a pair of upwardly extending ears 14a of the post 14 which also have aligned holes. A bolt extends through the holes in the yoke side members 16a and the ears 14a to pivotally connect the yoke to the post thereby enabling the yoke to rotate or rock back and forth about a lateral pivot axis x—x. If desired, a bearing sleeve may be interposed over the bolt.

An upwardly projecting ear member 15, is integrally formed with the baseplate adjacent the forward or distal edge 12e thereof. See FIGS. 3 and 4. A ball-joint fixture 24 is mounted on the upstanding ear 15 and includes a laterally extending spherical bearing member 24a which is adapted to be seated in a press-fit coupling member 26 to provide a ball-socket connection. An adjustable connecting rod 28 is secured at one end to the coupling 26. As will be described in further detail below, the opposite end of connection rod 28 is operably connected to the distal end of a handle secured to the base plate to rotate relative to the yoke about the pivot axis in response to the rotation of the handle.

The yoke 16 includes a pair of upwardly extending front and rear support arms 16c and 16d separated by a guide slot with side walls 16e and end walls 16f. The support arms form an upper arcuate portion 16g, e.g., commensurate with the span of the guide slot and encompassing about a semi-circular 180° sector. The support arms are also formed with a cylindrical passageway 16h aligned along a longitudinal axis a—a. The guide slot end walls 16f are aligned along a lateral axis parallel to the pivot axis x—x and to baseplate 12. The lateral axis with which the end walls 16f are aligned is also perpendicular to the longitudinal axis a—a, as is shown in FIG. 4. The passageway rotatably supports a tubular handle receiving member 30. The handle receiving member 30 includes a conventional spring loaded detent 30a which extends through opposed holes 32a in the forward end of a handle 32 to secure the handle 32 to handle receiving member 30 in a conventional manner. The handle receiving member rotates with the handle to adjust the angle of incidence of the smoothing plate of the fresno (or bull plate) as will be explained.

The maximum rotational movement of the handle receiving member and the handle attached thereto, relative to the yoke and base plate, is controlled by the guide slot and a stop member in the form of a set screw 44. The set screw is threaded into a tapped hole in the handle receiving member 30 rides within the guide slot and circumscribes an arc of about 180°, from say 3 o'clock to 9 o'clock as it moves from one end wall 16f of the guide slot to the other. Longitudinal forces applied to the handle and handle receiving member are transferred to the yoke and base plate via the set screw contacting the side walls 16e of the guide slot.

A caming ring 34 is secured to the forward or distal end of the handle receiving member (which extends beyond the forward end of the yoke) by means of a set screw 34a. A ball joint fixture 36 is mounted at a pivot point 34b (FIG. 3) on an outwardly extending ear 34c of the caming ring. A coupling member 38, connected to the outer end of the actuating rod 28, seats over the spherical ball bearing member 36a of the ball joint fixture 36.

It is to be noted that the distance from the central axis a—a of the handle receiving member 42 to the center of the ball joint bearing member, i.e., caming ring pivot point 34b, determines the relative extreme angular position of the base plate 12 and the fresno 18 (or bull float) connected thereto with a 180° rotation of the handle. Accordingly, the angle of incidence of the fresno's (or bull floats) forward and rear edges 18c and 18d, respectively, is controlled by the user of the tool when turning the handle within a set restricted arc. As the handle receiving member traverses the 180° angle the finishing tool's smoothing plate rotates through an angle of about 90° or about ±45° with respect to the horizon.

The bracket include a reliable and readily adjustable braking element to hold the base plate 12 (and the finishing tool's smoothing plate) in a preselected position upon termination of rotation of the handle.

This braking element is the form of a friction plug 40, made for example of a relatively hard plastic, such as PVC, a compression spring 42 and a screw 44 positioned, in that order, within a threaded bore 16i in the lower portion of the yoke 16. The friction plug is forced against the outer wall of the handle receiving member by the spring. The position of the screw 44 within the hole 16i determines the amount of force which the plug exerts against the outer wall of the handle receiving member and thus the degree of frictional force between the handle receiving member and the yoke. The spring allows the user to accurately control the frictional force so that the angle of incidence of the smoothing plate 18 may be changed relative to the cement slab without requiring the use of excessive force in turning the handle while at the same time maintaining the incidence angle fixed once the user ceases deliberate rotation of the handle.

Accordingly, the angle of incidence with respect to a concrete surface 62 of the fresnos (or bull float's) forward and rear edges 18a and 18b, respectively, is controlled by the user of the tool by turning the handle within a set restricted arc.

The use of the adjustable angle bracket with bull floats is illustrated in FIGS. 8 and 9. As is illustrated in FIG. 9, bull floats, such as the float 46, conventionally include a pair of centrally located, upwardly extending, rectangular structural ribs 46a. The ribs may be cast or molded as an integral part of the smoothing plate. Bolts 20' may be inserted through holes 12c of the base plate and threaded into tapped blind bores 46b in the ribs 46a to secure the bracket to a bull float such as the one illustrated in FIG. 9. The forward and rear edges of the bull float are designated by the numerals 46c and 46d.

As discussed previously some bull floats have a single reinforcing rib which is centrally located permitting the use of bolts through apertures 12b for securing the bracket to the float. Where the bull float has a plate overlying the smoothing plate, as is the case of the float shown in the '527 patent, the apertures 12c may be used to secure the bracket to tapped holes in the plate.

Various modifications and improvements to the preferred embodiment disclosed herein will occur to those skilled in the art without involving any departure from the spirit and scope of the invention as defined in the appended claims.

There has thus been described a universal adjustable angle bracket for concrete leveling/finishing tools which may be readily attached to bull floats as well as fresnos.

What is claimed is:

1. In an angularly adjustable universal bracket adapted for connection to a concrete leveling/finishing tool having a bottom generally defining a plane with the finishing tool having a centrally disposed rectangular reinforcing and handle mounting bar, the combination comprising:

a base plate having a top and bottom surface with a plurality of spaced holes extending between the surfaces through which bolts may be inserted for attaching the base plate to a leveling/finishing tool, the base plate defining an elongated lateral mounting slot extending upwardly from the bottom surface for receiving a finishing tool's rectangular reinforcing and handle mounting bar;

a yoke pivotally mounted to the base plate, the yoke defining a cylindrical passageway therein aligned along a longitudinal axis disposed generally at a right angle to the mounting slot and the axis about which the yoke pivots, the yoke further defining an upper arcuate portion and a guide slot therein circumscribing a semi-circular arc of about 180°, the guide slot having side and end walls with the end walls being aligned generally along a lateral axis generally parallel to the base plate and perpendicular to the longitudinal axis;

a tubular handle receiving member having an outer wall and extending through the cylindrical passageway in the yoke and adapted to rotate therein, the handle receiving member having a distal end located beyond the forward end of the yoke;

a caming ring secured to the distal end of the handle receiving member for rotation therewith, the caming ring defining a pivot point spaced from the longitudinal axis;

an actuating rod pivotally mounted between the caming ring pivot point and the base plate so that the base plate and a leveling/finishing tool secured thereto will pivot around the pivot axis when the handle receiving member is rotated; and a stop member secured to the handle receiving member and having a free end which rides in the yoke guide slot for limiting the degree of rotation of the handle receiving member and for transferring longitudinal forces applied to the handle receiving member to the yoke and base plate, the caming ring pivot point moving from about a 3 o'clock position to a 9 o'clock position as the stop member moves from one end wall of the guide slot to the other end wall.

2. The invention of claim 1 further including an adjustable braking element carried by the yoke for exerting a frictional force between the yoke and the handle receiving member to inhibit relative rotational movement therebetween, whereby the plane of the leveling/finishing tool relative to the longitudinal axis will remain substantially fixed once the deliberate rotation of the handle receiving member ceases.

3. The invention of claim 2 wherein the yoke includes a threaded bore extending therethrough with a distal end located adjacent the outer wall of the handle receiving member and wherein the braking element comprises a friction plug, a spring and a screw positioned in that order within the threaded bore so that the forward end of the plug is forced against the outer wall of the handle receiving member by the spring and screw, the position of the screw in the bore determining the amount of force.

4. The invention of claim 3 wherein the pivotal mounting between the actuating rod, the caming ring and the base plate comprises a pair of ball and socket connections.

5. The invention of claim 4 wherein the base plate includes an upwardly extending post and the yoke includes a pair of downwardly projecting side members which straddle the post with the pivotal connection extending through the side members and the post.

6. A universal adjustable angle bracket for a concrete leveling/finishing tool having a bottom generally defining a plane and at least one upwardly projecting rectangular reinforcing and handle mounting bar comprising:

a base plate having front and rear edges with a plurality of spaced holes extending through the plate through which bolts may be inserted for attaching the base plate to said at least one reinforcing rib of a leveling/finishing tool, the base plate defining an elongated lateral mounting slot extending upwardly from the bottom surface for receiving a finishing tool's reinforcing and handle mounting bar, the base plate further including an upwardly extending post and adjacent the rear edge and an upstanding ear adjacent the front edge;

a yoke including a pair of downwardly projecting side members pivotally mounted to the base plate, the yoke defining a cylindrical passageway therein aligned along a longitudinal axis disposed generally at a right angle to the mounting slot and the axis about which the yoke pivots, the yoke further defining an upper arcuate portion and a guide slot therein circumscribing an arc of about 180°, the guide slot having side and end walls with the end walls being aligned generally along a lateral axis substantially parallel to the yoke pivot axis;

a tubular handle receiving member extending through the cylindrical passageway in the yoke and adapted to rotate therein, the handle receiving member having a distal end located beyond the forward end of the yoke;

a caming ring secured to the distal end of the handle receiving member for rotation therewith, the caming ring defining a pivot point spaced from the longitudinal axis;

an actuating rod pivotally mounted between the caming ring pivot point and the base plate so that the base plate and a leveling/finishing tool secured thereto will pivot around the pivot axis when the handle receiving member is rotated;

a stop member secured to the handle receiving member and having a free end which rides in the yoke guide slot for limiting the degree of rotation of the handle receiving member and for transferring longitudinal forces applied to the handle receiving member to the yoke and base plate, the caming ring pivot point moving from about a 3 o'clock position to a 9 o'clock position along the circumference of a circle as the stop member moves from one end wall of the guide slot to the other end wall; and an adjustable braking element carried by the yoke for exerting a frictional force between the yoke and the handle receiving member to inhibit relative rotational movement therebetween, whereby the plane of the leveling/finishing tool relative to the longitudinal axis will remain substantially fixed once the deliberate rotation of the handle receiving member ceases.

7. The invention of claim 6 wherein the yoke includes a threaded bore extending therethrough with a distal end located adjacent the outer surface of the handle receiving member and wherein the braking element comprises a friction plug, a spring and a screw positioned in that order within the threaded bore so that the forward end of the plug is forced against the outer wall of the handle receiving member by the spring and screw, the position of the screw in the bore determining the amount of force.

8. The invention of claim 7 wherein the friction plug is made of a hard plastic material.

* * * * *